(12) United States Patent
Kelly et al.

(10) Patent No.: US 6,197,730 B1
(45) Date of Patent: *Mar. 6, 2001

(54) COMPOSITIONS FOR FRACTURING SUBTERRANEAN FORMATIONS

(75) Inventors: Robert M. Kelly, Cary; Saad A. Khan, Raleigh; Pascal Leduc, Raleigh; Akash Tayal, Raleigh, all of NC (US); Robert K. Prud'homme, Princeton Junction, NJ (US)

(73) Assignees: North Carolina State University, Raleigh, NC (US); The Trustees of Princeton University, Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/185,120

(22) Filed: Nov. 3, 1998

Related U.S. Application Data

(60) Continuation of application No. 08/403,078, filed on Mar. 13, 1995, now Pat. No. 5,869,435, which is a division of application No. 08/209,679, filed on Mar. 10, 1994, now Pat. No. 5,421,412.

(51) Int. Cl.[7] .................................................. C09K 7/02

(52) U.S. Cl. ........................... 507/211; 507/201; 507/923

(58) Field of Search .................................... 507/201, 211, 507/923

(56) References Cited

U.S. PATENT DOCUMENTS

| | | | |
|---|---|---|---|
| 3,922,173 | 11/1975 | Misak | 106/194 |
| 4,250,044 | 2/1981 | Hinkel | 252/8.55 R |
| 4,502,967 | 3/1985 | Conway | 252/8.55 R |
| 4,996,153 | 2/1991 | Cadmus et al. | 435/209 |
| 5,067,566 | 11/1991 | Dawson | 166/308 |
| 5,201,370 | 4/1993 | Tjon-Joe-Pin | 166/300 |
| 5,226,479 | 7/1993 | Gupta et al. | 166/300 |
| 5,247,995 | 9/1993 | Tjon-Joe-Pin et al. | 166/312 |
| 5,297,625 | 3/1994 | Premuzic et al. | 166/246 |
| 5,421,412 * | 6/1995 | Kelly et al. | 166/300 |
| 5,476,775 | 12/1995 | Fodge et al. | 435/209 |

(List continued on next page.)

OTHER PUBLICATIONS

Gibbs, M.D. et al.; The β–Mannanase from "*Caldocellum saccharolyticum*" Is Part of a Multidomain Enzyme, Applied and Environmental Microbiology, Dec. 1992, pp. 3864–3867.

Gulbis, J. et al.; Fracturing Fluid Chemistry, *Reservoir Stimulation*, 2$^{nd}$ Edition, M.J. Economides and K.G. Nolte, Editors, 1989 (ISBN 0–13–774472–2; ISBN 0–13–775115–X), pp. 4–1–4–14.

Lüthi, E. et al.; Cloning, Sequence Analysis and Expression in *Escherichia coli* of a Gene Coding for a β–Mannanase from the Extremely Thermophilic Bacterium "*Caldocellum saccharolyticum*", Applied and Environmental Microbiology, Mar. 1991, pp. 694–700.

*Primary Examiner*—Randy Gulakowski
*Assistant Examiner*—LaToya I. Cross
(74) *Attorney, Agent, or Firm*—Myers Bigel Sibley & Sajovec

(57) ABSTRACT

A method of fracturing a subterranean formation which surrounds a well bore comprises the steps of providing a fracturing fluid, and injecting the fracturing fluid into the well bore at a pressure sufficient to form fractures in the subterranean formation which surrounds the well bore. The pressure is then released from the fracturing fluid, after which the fluid may be removed from the well and the well placed into production. The fracturing fluid comprises an aqueous liquid, a polysaccharide soluble or dispersible in the aqueous liquid in an amount sufficient to increase the viscosity of the aqueous liquid, an enzyme breaker which degrades the polysaccharide at a temperature above 180° F. Fracturing fluid compositions and enzyme breaker systems useful for carrying out the invention are also disclosed.

48 Claims, 3 Drawing Sheets

U.S. PATENT DOCUMENTS 5,547,026 * 8/1996 Brannon et al. ...................... 166/295
5,562,160 * 10/1996 Brannon et al. ................... 166/250.1
5,795,764 * 8/1998 Christgau et al. ................... 435/200
5,869,435 * 2/1999 Kelly et al. .......................... 507/211

* cited by examiner

COMPOSITIONS FOR FRACTURING SUBTERRANEAN FORMATIONS

RELATED APPLICATIONS

This application is a continuation of co-pending U.S. application Ser. No. 08/403,078, filed on Mar. 13, 1995, now U.S. Pat. No. 5,869,435 which is a divisional of U.S. application Ser. No. 08/209,679, filed on Mar. 10, 1994, which issued as U.S. Pat. No. 5,421,412, the disclosure of which is incorporated by reference herein in its entirety.

This invention was made with Government support under grant number BCS-93-10964 from the National Science Foundation. The Government has certain rights to this invention.

FIELD OF THE INVENTION

This invention concerns thermostable enzyme breakers for the hydrolysis of galactomannans in hydraulic fracturing fluids.

BACKGROUND OF THE INVENTION

When the pressure of oil or gas in a reservoir declines as oil or gas is taken from that reservoir, production from a well in that reservoir declines and the economic viability of the well declines until it is no longer profitable to operate (even though it continues to produce gas or oil). Production can be increased from such wells through oil well stimulation. In addition, where forming a bore hole into a reservoir is very expensive, such as in offshore drilling, it is desirable to stimulate production from a single well.

Oil well stimulation typically involves injecting a fracturing fluid into the well bore at extremely high pressures to create fractures in the rock formation surrounding the bore. The fractures radiate outwardly from the well bore, typically from 100 to 1000 meters, and extend the surface area from which oil or gas drains into the well. The fracturing fluid typically carries a propping agent, or "proppant", such as sand, so that the fractures are propped open when the pressure on the fracturing fluid is released, and the fracture closes around the propping agent. This leaves a zone of high permeability (the propping agent trapped and compacted in the fracture in the subterranean formation.

The fracturing fluid typically contains a water soluble polymer, such a guar gum or a derivative thereof, which provides appropriate flow characteristics to the fluid and suspends the proppant particles therein. When pressure on the fracturing fluid is released and the fracture closes around the propping agent, water is forced therefrom and the water-soluble polymer forms a compacted cake. This compacted cake can prevent oil or gas flow if not removed. To solve this problem, "breakers" are included in the fracturing fluid.

Currently, breakers are either enzymatic breakers or oxidative breakers. The enzyme breakers are preferable, because (a) they are true "catalysts", (b) they are relatively high in molecular weight and do not leak off into the surrounding formation, and (c) they are less susceptible to dramatic changes in activity by trace contaminants. Oxidative breakers, on the other hand, are low in molecular weight and leak off into the formation, and they are active only over a very narrow temperature range. Enzyme breakers, however, are inactive at higher temperatures, limiting their use to shallow wells. It would accordingly be highly desirable to have enzyme breakers that operate at higher temperatures to enable fracturing of deep wells. See generally J. Gulbis, Fracturing Fluid Chemistry, in RESERVOIR STIMULATION, Chap. 4 (J. J. Economides and K. G. Nolte, Eds., 2d Ed. 1989).

U.S. Pat. No. 4,996,153 to Cadmus and Slodki discloses a heat-stable enzyme breaker which may be used as a viscosity breaker in oil recovery, but this breaker is a xanthanase for degrading zanthan-based rather than guar-based fracturing fluids, and is only said to be active at 55° C. (156.6° F.).

U.S. Pat. No. 5,201,370 to Tjon-Joe-Pin discloses enzyme breakers for galactomannan-based fracturing fluids, which enzyme breakers are galactomannases that hydrolyze the 1,6-α-D-galactomannosidic and the 1,4-β-D-mannosidic linkages in the guar polymer, but these are said to only be active at low to moderate temperatures of about 50° F. to 180° F.

U.S. Pat. No. 4,250,044 to Hinkel concerns a tertiary amine/persulfate breaker system, and not an enzyme system.

In view of the foregoing, there is a continued need for thermostable enzyme breakers useful for fracturing subterranean formations in the course of oil and gas well stimulation.

SUMMARY OF THE INVENTION

A first aspect of the present invention is a method of fracturing a subterranean formation which surrounds a well bore. The method comprises the steps of providing a fracturing fluid, and injecting the fracturing fluid into the well bore at a pressure sufficient to form fractures in the subterranean formation which surrounds the well bore. The pressure is then released from the fracturing fluid, after which the fluid may be removed from the well and the well placed into production. The fracturing fluid comprises an aqueous liquid, a polysaccharide soluble or dispersible in the aqueous liquid in an amount sufficient to increase the viscosity of the aqueous liquid, an enzyme breaker which degrades said polysaccharide at a temperature above 180° F.

A second aspect of the present invention is a hydraulic fracturing fluid useful for fracturing a subterranean formation which surrounds a well bore. The fracturing fluid comprises an aqueous liquid; a polysaccharide soluble or dispersible in the aqueous liquid in an amount sufficient to increase the viscosity of said aqueous liquid (said polysaccharide typically included in said aqueous liquid in an amount of from about 0.1 to 1 percent by weight); and an enzyme breaker which degrades said polysaccharide at a temperature between 180° F. and 280° F., the enzyme breaker included in an amount effective to degrade the polysaccharide at that temperature.

A third aspect of the present invention is an enzyme breaker useful for preparing hydraulic fracturing fluids for fracturing a subterranean formation which surrounds a well bore. The enzyme breaker comprises in combination, a mannanase which degrades polysaccharide at a temperature above 180° F. and an α-galactosidase which degrades polysaccharide at a temperature above 180° F.

A fourth aspect of the present invention is a heat-stable α-galactosidase composition which hydrolyzes α-1,6 hemicellulolytic linkages in galactomannans, is isolated from hyperthermophilic organisms (e.g., as a cell-free extract thereof), is active at a temperature above 180° F., and is essentially inactive at a temperature of 100° F. or less.

In addition to making available enzyme breakers for higher temperature wells, a still further advantage of the present invention is that, by employing enzyme breakers which are essentially inactive at the temperature at which the fracturing fluid is initially provided, the problem of premature breaking of the fracturing fluid is inhibited or reduced. As discussed in U.S. Pat. No. 3,922,173 to Misak at columns 1–2, premature breaking of the gelled fracturing fluid (or "sanding out") can cause suspended proppant particles to settle out of the fracturing fluid before being introduced a sufficient distance into the fractures. This causes blockage of the fracture and/or an undesirable diminution of potential fracture width. The problem of premature breaking is reduced or inhibited in the present invention because the enzyme breaker is essentially inactive at the temperature at which the fracturing fluid is initially provided (e.g., usually ambient temperature, and not more than 90 or 100° F.). The enzyme becomes active at the elevated temperatures encountered in the subterranean formation surrounding the well bore, which is precisely the point at which enzyme activity leading to a breaking of the fracturing fluid viscosity is desired. Thus, the present invention advantageously provides a temperature control means for controlling the timing of activation of the enzyme breaker.

E. Luthi et al., *Appl. Environ. Microbiol.* 57, 694 (1991), and M. Gibbs et al., *Appl. Environ. Microbiol.* 58, 3864 (1992), both concern a heat-stable β-mannanase, but do not disclose a heat stable α-galactosidase, do not suggest their use in oil well fracture fluids, and do not address the problem of premature breaking.

The foregoing and other objects and advantages of the present invention are explained in detail in the drawings herein and the specification set forth below.

DETAILED DESCRIPTION OF THE INVENTION

Figure 1:
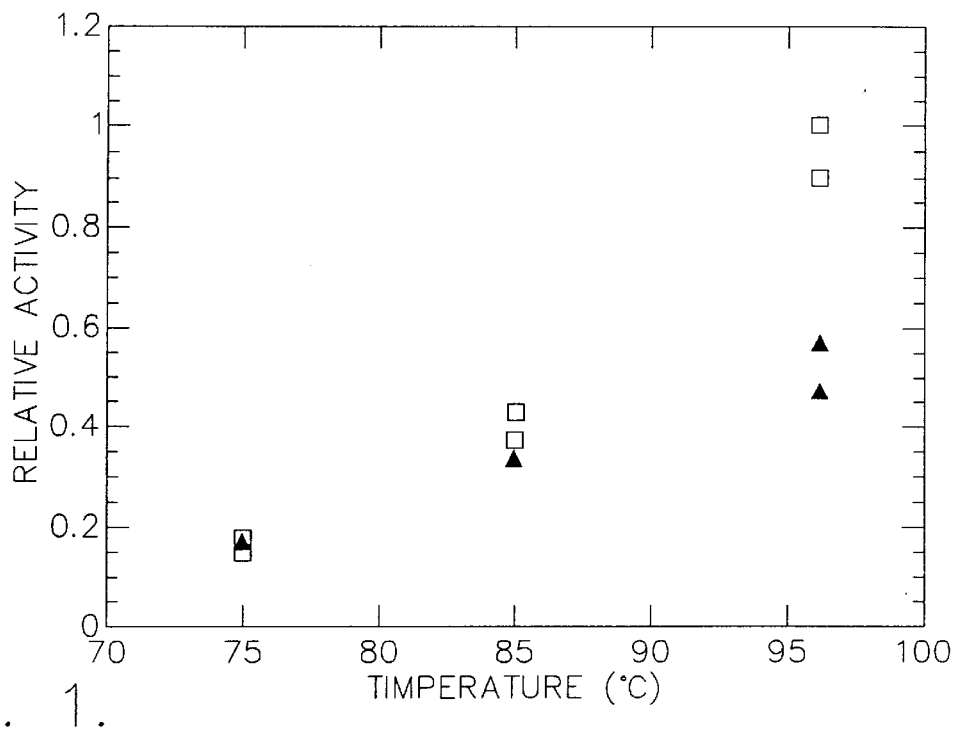
FIG. 1 shows the effect of temperature (given in degrees Centigrade) on relative activity of the galactosidase activity and mannanase activity found in an enzyme breaker composition prepared from *Thermotoga neopolitana* 5068. The open squares represent galactosidase activity, while the filled triangles represent mannanase activity.

Fracturing fluids used to carry out the present invention are, in general, prepared from an aqueous base fluid such as water, brine, aqueous foams or water-alcohol mixtures. Any suitable mixing apparatus may be used to provide the fracturing fluid. The pH of the fluid is typically from about 2 to 11 or 12. The fracturing fluid includes a polysaccharide as a gelling agent, as discussed below, and typically includes other ingredients such as proppant particles and crosslinking agents to crosslink the polysaccharide gelling agent, also discussed below.

Polysaccharides soluble or dispersible in an aqueous liquid include industrial gums such as those generally classified as exudate gums, seaweed gums, seed gums, microbial polysaccharides, and hemicelluloses (cell wall polysaccharides found in land plants) other than cellulose and pectins. Examples include xylan, mannan, galactan, L-arabinoxylans, L-arabino-D-glucurono-D-xylans, D-gluco-D-mannans, D-Galacto-D-mannans, arabino-D-galactans, algins such as sodium alginate, carrageenin, fucordan, laminarin, agar, gum arabic, gum ghatti, karaya gum, tamarind gum, tragacanth gum, locust bean gum, cellulose derivative such as hydroxyethylcellulose or hydroxypropylcellulose, and the like. Particularly preferred are the hydratable polysaccharides having galactose and/or mannose monosaccharide components, examples of which include the galactomannan gums, guar gum and derivatized guar gum. Examples of particularly preferred thickening agents are guar gum, hydroxypropyl guar, and carboxymethyl hydroxypropyl guar.

The amount of polysaccharide included in the fracturing fluid is not particularly critical, so long as the viscosity of the fluid is sufficiently high to keep the proppant particles suspended therein during the injecting step. Thus, depending upon the application, the polysaccharide is included in the fracturing fluid in an amount of from about 10 to 150 pounds of polysaccharide per 1000 gallons of aqueous liquid, and more preferably in an amount of from about 20 to 100 pounds of polysaccharide per 1000 gallons of aqueous solution (about 2.4 to 12 kg/m$^3$).

Any crosslinking agent may be used to carry out the present invention. Examples include metal ions including aluminum, antimony, zirconium an titanium containing compounds including organotitantates (see, e.g., U.S. Pat. No. 4,514,309). Borate crosslinking agents or borate ion donating materials, are currently preferred. Examples of these include the alkali metal and alkaline earth metal borates and boric acid, such as sodium borate decahydrate. The crosslinking agent is typically included in an amount in the range of from about 0.0245 to 0.18% by weight of the aqueous fluid or more.

Proppant particles or propping agents are typically added to the base fluid prior to the addition of the crosslinking agent. Propping agents include, for example, quart sand grains, glass and ceramic beads, walnut shell fragments, alluminum pellets, nylon pellets, and the like. The propping agents are typically included in an amount of from 1 to 8 or even 18 pounds per gallon of fracturing fluid composition. Particle size of the proppant particles is typically in the range of about 200 to about 2 mesh on the U.S. Sieve Series scale. The base fluid may also contain other conventional fracturing fluid additives, such as buffers, surfactants, antioxidants, corrosion inhibitors, bactericides, etc.

Enzyme breaker compositions useful for carrying out the present invention may be provided in any suitable physical form, such as concentrated or dilute aqueous solutions, lyophylized powders, etc. The compositions contain an enzyme effective for degrading the particular crosslinking polysaccharide employed as the gelling agent. The compositions typically include a β-Mannanase which degrades β-1,4 hemicellulolytic linkages in galactomannan compounds such as guar gums at a temperature above 180° F., and/or an a-galactosidase which degrades α-1,6 hemicellulolytic linkages in galactomannan compounds such as guar gums at a temperature above 180° F. Typically, the enzyme breaker composition and one or more of the enzymes therein are at least capable of degrading the polysaccharide at temperatures of from 180° F. to 212° F. Preferably, as discussed above, the enzyme breaker and one or more of the enzymes therein are also essentially incapable of degrading the polysaccharide at a temperature of 90 or 100° F. or less (e.g., have relative activity of 0.1 or even 0.05 of optimum activity (1.0) at these temperatures).

Enzymes useful for preparing enzyme breaker compositions used in the present invention may be obtained from hyperthermophilic microorganisms. Hyperthermophilic microorganisms are microorganisms which grow at temperatures higher than 90° C., and have an optimal growth temperature higher than 80° C. Generally, hyperthermophilic organisms are either hyperthermophilic bacteria or hyperthermophilic Archaea (as categorized according to C. Woese et al., *Proc. Natl. Acad. Sci. USA* 87, 4576–4579 (1990)). These organisms are found in, for example, the Thermoproteales, Sulfolobales, Pyrodictiales, Thermococcales, Archaeoglobales, Methanococcales, Methanobacteriales, Methanopyrales, Thermotogales, and Aquificales groups. Typically these organisms are found in the genera Aquifex, Archaeoglobus, Thermotoga, Thermoproteus, Staphylothermus, Desulfurococcus, Thermofilum, Pyrobaculum, Acidianus, Desulfurolobus, Pyrodictium, Thermodiscus, Pyrococcus, Thermococcus, Hyperthermus, Methanococcus, Methanothermus, and Methanopyrus. See, e.g., Biocatalysis at Extreme Temperatures, pgs. 4–22 (M. Adams and R. Kelly Eds. 1992)(ACS Symposium Series 498). The genera Thermotoga, Thermococcus, and Pyrococcus are particularly convenient sources of organisms useful for carrying out the present invention. Specific organisms from which enzymes useful in carrying out the present invention may be obtained include, but are not limited to, *Pyrococcus furiosus*, *Pyrococcus furiosus* GBD, *Thermotoga maritima*, *Thermus aquaticus*, *Thermus thermophilous*, *Thermococcus litoralis*, ES-1, ES-4, etc. The enzymes are identified in bacteria supernatant or lysed cell extracts by conventional techniques, such as by isolating and culturing the organisms on media which contain the appropriate growth substrates (e.g., for α-D-galactosidase activity on the substrate p-Nitrophenyl-α-D-Galactopyranoside; for β-D-mannanase activity on the substrate p-Nitrophenyl-β-D-Mannopyranoside), DNA screening with consensus oligonucleotide probes, "shotgun" cloning and screening of transformed host cells with antibodies and/or gel plate assays (e.g., plates containing the growth substrates given above), etc. The enzymes may be produced by any suitable means, including either conventional fermentation in a high temperature fermentor or by genetic engineering techniques.

The present invention may be carried out on subterranean formations which surround any type of well bore, including both oil and gas well bores, with the fracturing fluid being provided and injected and pressure released, etc., all in accordance with procedures well known to those skilled in the art. As noted above, the invention is particularly advantageously employed when the subterranean formation surrounding the well bore to be fractured has a temperature greater than 180° F., up to 280° F. or more (it being understood that other subterranean formations which surround the well bore, which may or may not be integral with the subterranean formation having the aforesaid temperature may or may not be fractured and may or may not have the aforesaid temperature range).

In one embodiment of the invention, the step of providing the fracturing fluid (e.g. preparing and mixing the fluid on-site) is carried out at a temperature of 90 or 100° F. or less, the fracturing fluid thereby being maintained at a temperature of 90 to 100° F. or less prior to the injecting step. This serves to reduce premature breaking of the crosslinked polysaccharide and sanding out of the fracturing fluid, as discussed above.

The present invention is explained in greater detail in the following non-limiting Examples, where "DSM" means Deutsche Sammlung von Mikroorganimen (Braunsschweig, Federal Republic of Germany), "M" means Molar, "$\mu$M" means microMolar, "$\mu$m" means micrometer, "ml" means microliter, "L" means liter, "mg" means microgram, "g" means gram, "rpm" means revolutions per minute, "PSIG" means pounds per square inch gauge, and temperatures are given in degrees Centigrade unless otherwise indicated.

EXAMPLE 1

Thermotoga neodolitana Culture Conditions

*Thermotoga neopolitana* DSM 5068 cells were cultured in an artificial sea water (ASW) based media supplemented with 0.1% yeast extract and 0.5% tryptone, with 0.5% lactose and 0.03% guar gum added as inducers (the guar gum was obtained from Rhône-Poulenc). The media composition per liter was: NaCl 15.0 g, $Na_2SO_4$ 2.0 g, $MgCl_2.6H_2O$ 2.0 g, $CaCl_2.2H_2O$ 0.50 g, $NaHCO_3$ 0.25 g, $K_2HPO_4$ 0.10 g, KBr 50 mg, $H_3BO_3$ 20 mg, KI 20 mg, $Fe(NH_4)_2(SO_4)_2$ 15 mg, $Na_2WO_4.2H_2O$ 3 mg, and $NiCl_2 6H_2O$ 2 mg. The lactose, guar gum, $K_2HPO_4$, $Fe(NH_4)_2(SO_4)_2$ were added after sterilization. However, $K_2HPO_4$ and $Fe(NH_4)_2(SO_4)_2$ were filtered through a 0.2 $\mu$m filter prior to addition.

First, inocula were grown in closed bottles (125 ml) under anaerobic conditions. The cultures were prepared by heating the media-containing bottles to 98° C. for 30 minutes, then sparging with $N_2$, and then adding $Na_2S.9H_2O$ (0.5 g/L) from a 50 g/L stock solution. Prior to anaerobic inoculation, cultures were cooled to 80° C.

Large scale cultures were grown in a semi-batch fashion using a 8-liter fermentor (Bioengineering Lab Fermenter type 1 1523). Oxygen was removed by continuous flow of nitrogen of approximately 5 liter/minute. Temperature and agitation were monitored using a conventional data acquisition system and were set at 85±2° C. and 150 rpm respectively. Growth was monitored by epifluorescent microscopy using acridine orange stain.

Cells were harvested in late exponential growth phase (1.5 to $2.10^8$ cells/ml). 350 liters were harvested and concentrated down to approximately 60 liters using a 0.45 $\mu$m PELLICON™ cross-flow filter from Millipore. The retentate was then centrifuged at 8000 rpm for 30 minutes in 1-liter bottles. Cells were frozen at −20° C. until use.

EXAMPLE 2

Preparation of *T. neopolitana* Cell Extract

Frozen cells of *T. neopolitana* DSM 5068 prepared as described in Example 1 above were resuspended in 430 ml of 0.1M sodium phosphate buffer, pH 7.4 and disrupted by one passage through a French pressure cell at 1100 PSIG. $NaN_3$ (0.01%) was added at this stage to prevent contamination. Cell debris was removed by centrifugation at 10,000 g for 30 minutes, and the soluble fraction was used as the crude enzyme preparation.

EXAMPLE 3

Detection of Enzyme Activity

α-Galactosidase and β-mannanase activities were determined by using p-nitrophenyl-α-D-galactopyranoside and p-nitrophenyl-β-D-mannopyranoside respectively as substrates. Spectrophotometric readings were taken with a Lamda 3 spectrophotometer (The Perkin-Elmer Corp., Conn.) with a thermostated six cell transport. A liquid-circulating temperature bath (VWR Scientific model 1130) containing a 1:1 mixture of ethylene glycol and water was used to maintain the desired temperature in the cell holder. This temperature was monitored with a thermocouple mounted in a cuvette that was placed in the cell transport. The six-cell transport was controlled and data were collected and analyzed by Perkin-Elmer software run on a microcomputer.

Routine enzymatic assays for α-galactosidase and β-mannanase were conducted as follows. For each assay, 1.1 ml portions of substrate consisting 10 mM of substrate in 0.1M sodium phosphate buffer (pH 7.4) were pipetted into quartz cuvettes. The cuvettes were inserted into the cell holder, which was heated at the desired temperature, and preincubated for at least 10 minutes to allow the substrate to reach assay temperature. After the preincubation, 0.1 ml of sample was added to the cuvettes and the formation of the p-nitrophenyl (PNP) was followed by monitoring the optical density at 405 nm. A blank containing the same amount of sample in 0.1M sodium phosphate buffer (pH 7.4) was also monitored to correct for interferences. At temperatures below 100° C. and for a short period of time (less than 15 minutes) no nonenzymatic release of PNP was noticed. One unit of α-galactosidase or β-mannanase activity was defined as the amount of enzyme releasing 1 nmol of PNP per minute under the specified assay conditions.

Temperature optima were determined by performing the appropriate assay at the temperature indicated.

FIG. 1 shows the results obtained at 75° C., 85° C. and 96° C. for the cell extract of the large-scale culture prepared as described in Examples 1 and 2 above for both α-galactosidase and β-mannanase activities. Assays were performed as described above.

Relative activity is defined as the measured activity divided by the maximum activity (α-galactosidase activity at 96° C.).

Both activities increase with temperature but none of them reach an optimum in the considered temperature range. This result, however, shows that the optimal temperature for both activities is equal or greater than 96° C.

EXAMPLE 4

Pyrococcus furiosus Culture Conditions and Preparation of Cell Extract

*Pyrococcus furiosus* (DSM 3638) is grown in essentially the same manner as described in F. Bryant and M. Adams, *J. Biol. Chem.* 264, 5070–5079 (1989). Cell extract from the *P. furiosus* cultures is prepared in essentially the same manner as given in Example 2 above.

EXAMPLE 5

Rheological Testing Solutions

Standardized guar gum solutions were made for rheological testing. The composition for a preferred solution is shown in Table 1. The guar solution is prepared by using a blender set at low speed to provide a shallow vortex of water. The guar is sprinkled slowly onto the free surface to produce a uniform dispersion. KCl, glutaraldehyde and sodium thiosulfate are added quickly. The total mixing time is about two minutes. The glutaraldehyde is used as a bactericide, and the sodium thiosulfate serves as an antioxidant. The samples are then mixed for 20 hours using a horizontal shaker.

TABLE 1

Rheological Test Solution.

| MATERIAL | AMOUNT |
| --- | --- |
| Deionized water | 100 g |
| Guar gum (powder) | 0.7 g |
| Potassium chloride | 2 g |
| 25% glutaraldehyde solution in water | 50 ml |
| Sodium thiosulfate | 0.5 g |

EXAMPLE 6

Rheological Testing of Enzyme Preparations

Standard guar solutions for carrying out Theological tests prepared as described in Example 4 above are mixed with enzyme prepared as described in Examples 1 and 2 above and then incubated at 85° C./98° C. using a shaking oil bath. Samples are also incubated without any enzyme as a control.

Rheological measurements were performed using a Rheometrics Mechanical Spectrometer (RMS 800) using a cone and plate geometry with a diameter of 50 mm and a cone angle of 0.04 radians. The sample is loaded onto the rheometer and steady shear tests are performed (γ range 1–100 sec$^{-1}$). Steady shear viscosities are obtained this way for the samples with and without the enzyme. A lower viscosity curve for the sample with enzyme indicates effectiveness of the enzyme in degrading the guar gum solution.

Figure 2:
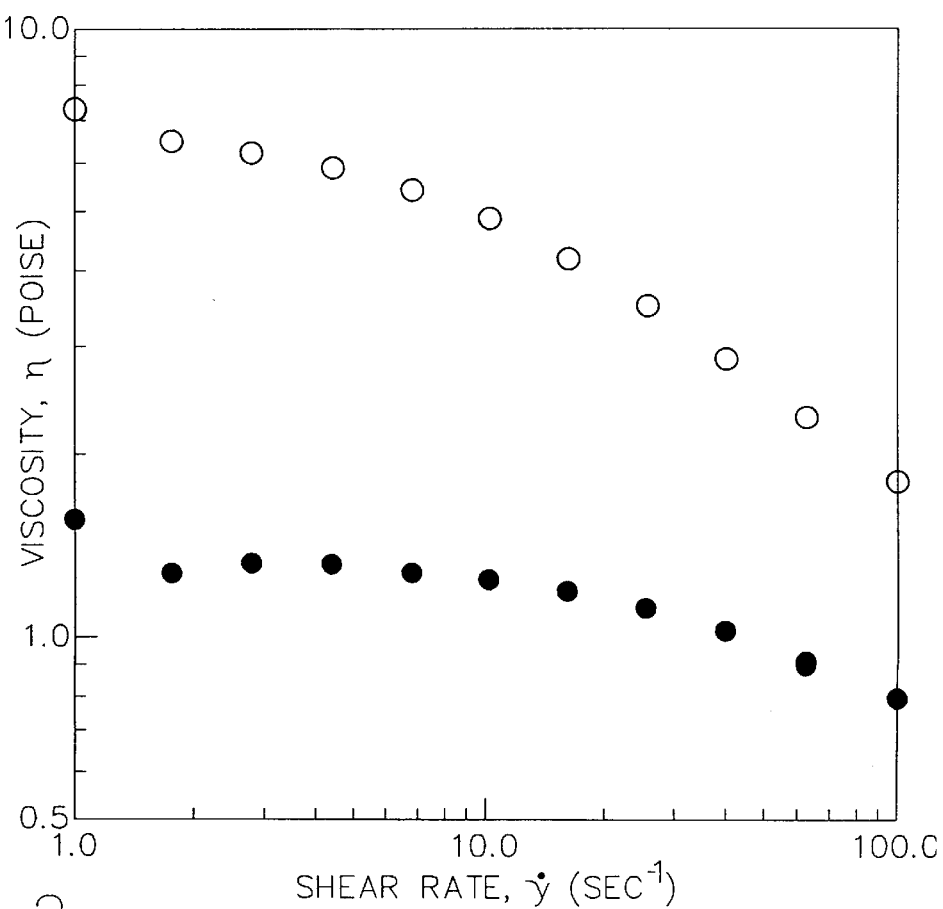
FIG. 2 shows the effect of the enzyme breaker composition of FIG. 1 on the viscosity of a 0.7% guar solution after 6 hours at 85° C. Viscosity, η (poise) is given on the vertical axis from 0.5 to 10.0, and shear rate, γ (sec$^{-1}$) is given on the horizontal axis from 1.0 to 100.0. Open circles represent values from a control solution with no enzyme added, and filled circles represent values from the solution with enzyme added.

FIG. 2 plots the data for the samples incubated for 6 hours at a temperature of 85° C. with *T. neopolitana* cell extract. Note that the samples used did not have an antioxidant and the viscosity curves are thus shifted downward compared to the other plots.

Figure 3:
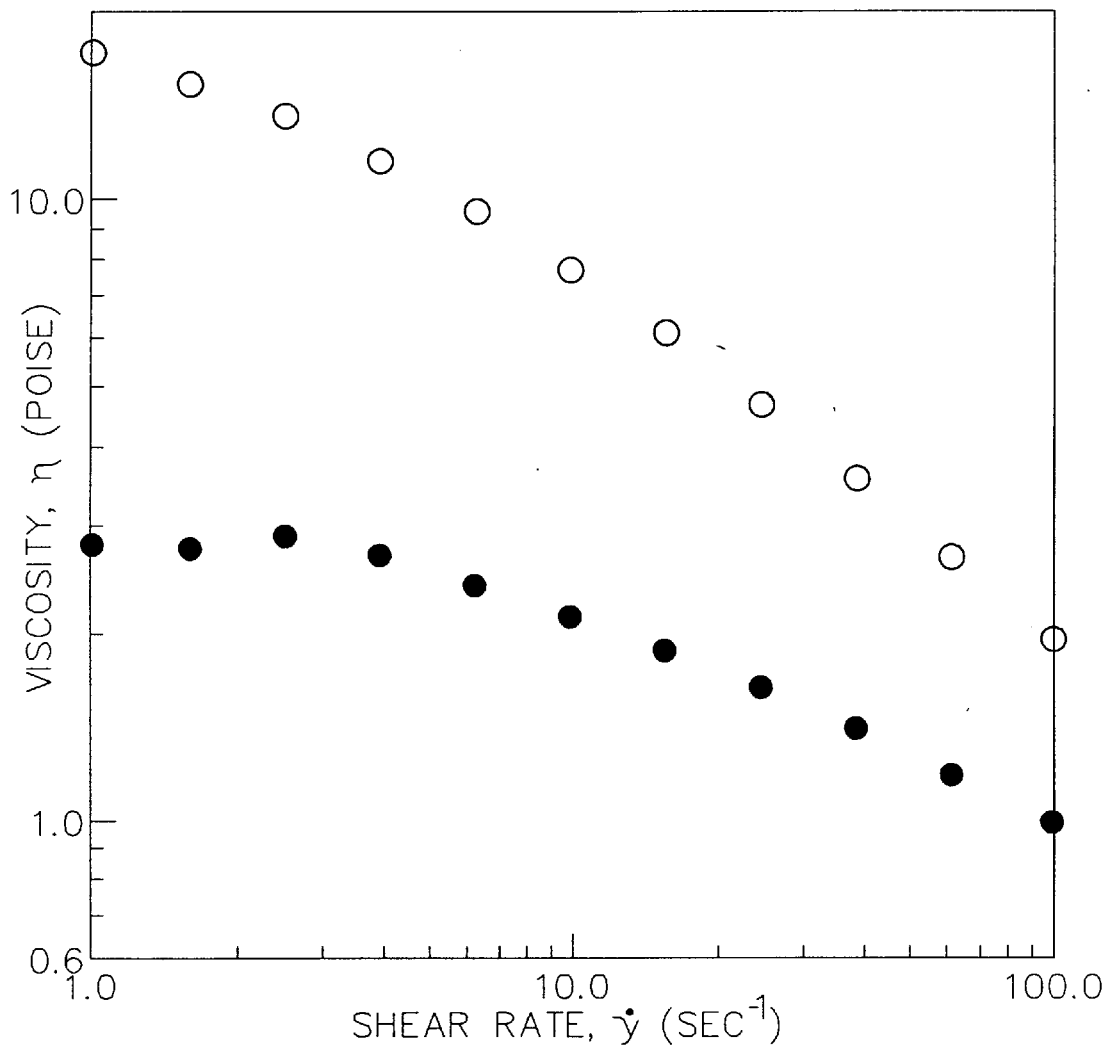
FIG. 3 is essentially the same as FIG. 2, except the guar solution was held for 6 hours at 98° C.

FIG. 3 shows data for samples incubated for 6 hours with *T. neopolitana* cell extract at 98° C.

Figure 4:
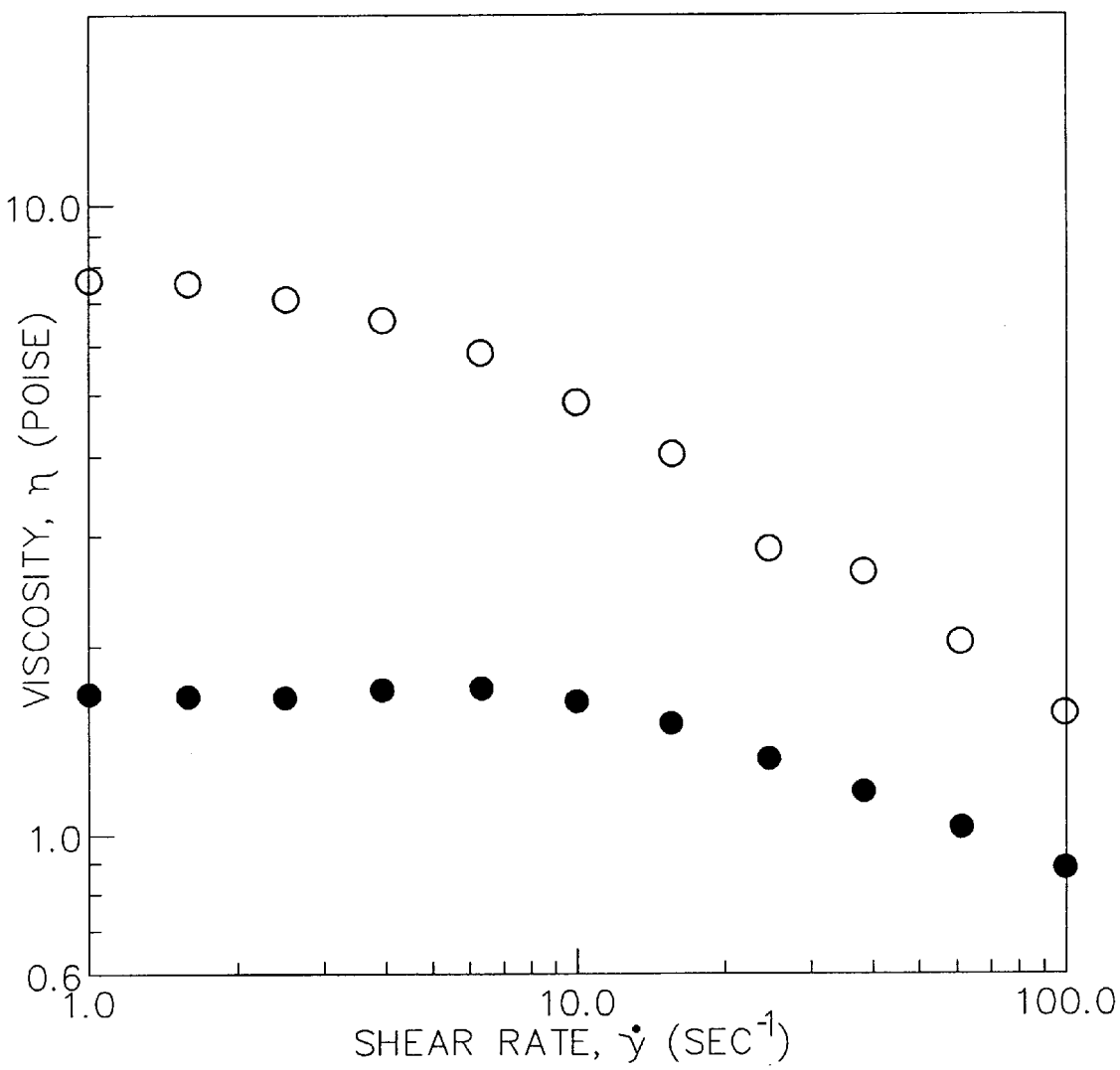
FIG. 4 is essentially the same at FIGS. 2 and 3, except the guar solution was held for 9 hours at 98° C., and the enzyme breaker was prepared from *Pyrococcus furiosus*.

FIG. 4 show data for samples incubated for 9 hours with *P. furiosus* cell extract at 98° C.

The low shear rate region in the foregoing figures has been shown sensitive to polymer microstructure and the large drops in viscosity at these shear rates ($^-$1–100 sec$^{-1}$) indicates breakup of the microstructure.

The foregoing is illustrative of the present invention, and not to be construed as limiting thereof. The invention is defined by the following claims, with equivalents of the claims to be included therein.

That which is claimed is:

1. A hydraulic fracturing fluid useful for fracturing a subterranean formation that surrounds a well bore, said fracturing fluid comprising:
   (a) an aqueous liquid; and
   (b) a polysaccharide soluble or dispersible in said aqueous liquid in an amount sufficient to increase the viscosity of said aqueous liquid; and
   (c) an enzyme breaker that degrades said polysaccharide at a temperature above 180° F. and that is essentially incapable of degrading said polysaccharide at a temperature of 100° F. or less, wherein said enzyme breaker comprises a mannanase that degrades said polysaccharide, said enzyme breaker included in an amount effective to degrade said polysaccharide at said temperature.

2. The fracturing fluid according to claim 1, wherein said polysaccharide is guar gum or derivatized guar gum.

3. The fracturing fluid according to claim 1, said fracturing fluid further comprising a crosslinking agent for crosslinking said polysaccharide.

4. The fracturing fluid according to claim 1, further comprising proppant particles.

5. The fracturing fluid according to claim 1, wherein said mannanase is isolated from a hyperthermophilic organism.

6. The fracturing fluid according to claim 1, wherein said mannanase hydrolyzes β-1,4 hemicellulolytic linkages.

7. The fracturing fluid according to claim 1, wherein said mannanase degrades polysaccharide at a temperature above 180° F. and is essentially incapable of degrading polysaccharide at a temperature of 100° F. or less.

8. The fracturing fluid according to claim 1, wherein said polysaccharide is included in said fracturing fluid in an amount from about 10 to about 150 pounds of polysaccharide per 1000 gallons of aqueous liquid.

9. The fracturing fluid according to claim 1, wherein said enzyme breaker degrades said polysaccharide at a temperature from about 180° F. to about 280° F.

10. The fracturing fluid according to claim 1, wherein said enzyme breaker degrades said polysaccharide at a temperature from about 180° F. to about 212° F.

11. The fracturing fluid according to claim 1, wherein said enzyme breaker degrades said polysaccharide at a temperature from about 195° F. to about 280° F.

12. The fracturing fluid according to claim 1, wherein said enzyme breaker degrades said polysaccharide at a temperature from about 195° F. to about 212° F.

13. The fracturing fluid according to claim 1, wherein said fracturing fluid further comprises an α-galactosidase that degrades said polysaccharide.

14. The fracturing fluid according to claim 13, wherein said α-galactosidase degrades said polysaccharide at a temperature above 180° F. and is essentially incapable of degrading said polysaccharide at a temperature of 100° F. or less.

15. A hydraulic fracturing fluid useful for fracturing a subterranean formation that surrounds a well bore, said fracturing fluid comprising:
(a) an aqueous liquid; and
(b) a polysaccharide soluble or dispersible in said aqueous liquid in an amount sufficient to increase the viscosity of said aqueous liquid; and
(c) an enzyme breaker that degrades said polysaccharide at a temperature above 180° F. and that is essentially incapable of degrading said polysaccharide at a temperature of 100° F. or less, wherein said enzyme breaker comprises an α-galactosidase that degrades said polysaccharide, said enzyme breaker included in an amount effective to degrade said polysaccharide at said temperature.

16. The fracturing fluid according to claim 15, wherein said polysaccharide is guar gum or derivatized guar gum.

17. The fracturing fluid according to claim 15, said fracturing fluid further comprising a crosslinking agent for crosslinking said polysaccharide.

18. The fracturing fluid according to claim 15, further comprising proppant particles.

19. The fracturing fluid according to claim 15, wherein said α-galactosidase is isolated from a hyperthermophilic organism.

20. The fracturing fluid according to claim 15, wherein said polysaccharide is included in said fracturing fluid in an amount from about 10 to about 150 pounds of polysaccharide per 1000 gallons of aqueous liquid.

21. The fracturing fluid according to claim 15, wherein said enzyme breaker degrades said polysaccharide at a temperature from about 180° F. to about 280° F.

22. The fracturing fluid according to claim 15, wherein said enzyme breaker degrades said polysaccharide at a temperature from about 180° F. to about 212° F.

23. The fracturing fluid according to claim 15, wherein said enzyme breaker degrades said polysaccharide at a temperature from about 195° F. to about 280° F.

24. The fracturing fluid according to claim 15, wherein said enzyme breaker degrades said polysaccharide at a temperature from about 195° F. to about 212° F.

25. The fracturing fluid according to claim 15, wherein said α-galactosidase hydrolyzes α-1,6 hemicellulolytic linkages in galactomannans.

26. The fracturing fluid according to claim 15, wherein said α-galactosidase degrades polysaccharide at a temperature above 180° F. and is essentially incapable of degrading polysaccharide at a temperature of 100° F. or less.

27. A hydraulic fracturing fluid useful for fracturing a subterranean formation that surrounds a well bore, said fracturing fluid comprising:
(a) an aqueous liquid; and
(b) a polysaccharide soluble or dispersible in said aqueous liquid in an amount sufficient to increase the viscosity of said aqueous liquid; and
(c) an enzyme breaker that degrades said polysaccharide at a temperature above 180° F. and that is essentially incapable of degrading said polysaccharide at a temperature of 100° F. or less, wherein said enzyme breaker comprises, in combination, a mannanase that hydrolyzes β-1,4 hemicellulolytic linkages in galactomannans and an α-galactosidase that hydrolyzes α-1,6 hemicellulolytic linkages in galactomannans, where said mannanase and said α-galactosidase hydrolyze said linkages at a temperature above 180° F. and are essentially incapable of degrading said linkages at a temperature of 100° F. or less, said enzyme breaker included in an amount effective to degrade said polysaccharide at said temperature.

28. A fracturing fluid according to claim 27, wherein said polysaccharide is guar gum or derivatized guar gum.

29. A fracturing fluid according to claim 27, said fracturing fluid further comprising a crosslinking agent for crosslinking said polysaccharide.

30. A fracturing fluid according to claim 27, further comprising proppant particles.

31. A fracturing fluid according to claim 27, wherein said mannanase and α-galactosidase are isolated from hyperthermophilic organisms.

32. The fracturing fluid according to claim 27, wherein said polysaccharide is included in said fracturing fluid in an amount from about 10 to about 150 pounds of polysaccharide per 1000 gallons of aqueous liquid.

33. The fracturing fluid according to claim 27, wherein said enzyme breaker degrades said polysaccharide at a temperature from about 180° F. to about 280° F.

34. The fracturing fluid according to claim 27, wherein said enzyme breaker degrades said polysaccharide at a temperature from about 180° F. to about 212° F.

35. The fracturing fluid according to claim 27, wherein said enzyme breaker degrades said polysaccharide at a temperature from about 195° F. to about 280° F.

36. The fracturing fluid according to claim 27, wherein said enzyme breaker degrades said polysaccharide at a temperature from about 195° F. to about 212° F.

37. A breaker composition useful for preparing hydraulic fracturing fluids for fracturing a subterranean formation that surrounds a well bore, said breaker comprising a mannanase that degrades polysaccharide at a temperature above 180° F.

and is essentially incapable of degrading said polysaccharide at a temperature of 100° F. or less.

38. The breaker composition according to claim 37, wherein said composition is an aqueous composition.

39. The breaker composition according to claim 37, wherein said mannanase hydrolyzes β-1,4 hemicellulolytic linkages in galactomannans at a temperature above 180° F. and is essentially incapable of hydrolyzing said linkages at a temperature of 100° F. or less.

40. A breaker composition useful for preparing hydraulic fracturing fluids for fracturing a subterranean formation that surrounds a well bore, said breaker comprising an α-galactosidase that degrades polysaccharide at a temperature above 180° F. and that is essentially incapable of degrading said polysaccharide at a temperature of 100° F. or less.

41. The breaker composition according to claim 40, wherein said composition is an aqueous composition.

42. The breaker composition according to claim 40, wherein said α-galactosidase hydrolyzes α-1,6 hemicellulolytic linkages in galactomannans at a temperature above 180° F. and is essentially incapable of hydrolyzing said linkages at a temperature of 100° F. or less.

43. A breaker composition useful for preparing hydraulic fracturing fluids for fracturing a subterranean formation that surrounds a well bore, said breaker comprising, in combination, a mannanase that hydrolyzes β-1,4 hemicellulolytic linkages in galactomannans and an α-galactosidase that hydrolyzes α-1,6 hemicellulolytic linkages in galactomannans, wherein said mannanase and said α-galactosidase hydrolyze said linkages at a temperature above 180° F. and are essentially incapable of hydrolyzing said linkages at a temperature of 100° F. or less.

44. The breaker composition according to claim 43, wherein said composition is an aqueous composition.

45. The breaker composition according to claim 43, wherein said breaker composition degrades said polysaccharide at a temperature from about 180° F. to about 280° F.

46. The breaker composition according to claim 43, wherein said breaker composition degrades said polysaccharide at a temperature from about 180° F. to about 212° F.

47. The breaker composition according to claim 43, wherein said breaker composition degrades said polysaccharide at a temperature from about 195° F. to about 280° F.

48. The breaker composition according to claim 43, wherein said breaker composition degrades said polysaccharide at a temperature from about 195° F. to about 212° F.

* * * * *

UNITED STATES PATENT AND TRADEMARK OFFICE
CERTIFICATE OF CORRECTION

PATENT NO. : 6,197,730 B1  Page 1 of 1
DATED : March 6, 2001
INVENTOR(S) : Robert M. Kelly et al.

It is certified that error appears in the above-identified patent and that said Letters Patent is hereby corrected as shown below:

Column 2,
Line 7, "zanthan" should read -- xanthan --.

Column 3,
Line 34, "galactosidase activity" should read -- galactosidase activity (open squares) --.
Line 35, "mannanase activity" should read -- mannanase activity (closed triangles) --.
Line 36, "*Thermotoga neopolitana*" should read -- *Thermotoga neapolitana* --.

Column 6,
Line 13, "*Thermotoga neodolitana*" should read -- *Thermotoga neapolitana* --.
Line 14, "*Thermotoga neopolitana*" should read -- *Thermotoga neapolitana* --.
Line 50, "*T. neopolitana*" should read -- *T. neapolitana* --.
Line 52, "*T. neopolitana*" should read -- *T. neapolitana* --.

Column 8,
Line 33, "*T. neopolitana*" should read -- *T. neapolitana* --.
Line 38, "*T. neopolitana*" should read -- *T. neapolitana* --.

Signed and Sealed this

Ninth Day of July, 2002

*Attest:*

JAMES E. ROGAN
*Attesting Officer*  *Director of the United States Patent and Trademark Office*